United States Patent
Lee et al.

(10) Patent No.: US 10,136,444 B2
(45) Date of Patent: Nov. 20, 2018

(54) COMMUNICATION METHOD USING OUTDATED CHANNEL STATE INFORMATION IN TWO-CELL, K-USER CELLULAR NETWORK

(71) Applicants: LG ELECTRONICS INC., Seoul (KR); KOREA ADVANCED INSTITUTE OF SCIENCE AND TECHNOLOGY, Daejeon (KR)

(72) Inventors: Kilbom Lee, Seoul (KR); Changho Suh, Daejeon (KR); Seiyun Shin, Seoul (KR); Jaewoong Cho, Seoul (KR); Jiwon Kang, Seoul (KR); Kitae Kim, Seoul (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 146 days.

(21) Appl. No.: 15/501,819

(22) PCT Filed: Aug. 14, 2014

(86) PCT No.: PCT/KR2014/007568
§ 371 (c)(1),
(2) Date: Feb. 3, 2017

(87) PCT Pub. No.: WO2016/024655
PCT Pub. Date: Feb. 18, 2016

(65) Prior Publication Data
US 2017/0245287 A1    Aug. 24, 2017

(51) Int. Cl.
*H04W 72/08*    (2009.01)
*H04B 7/26*    (2006.01)
(Continued)

(52) U.S. Cl.
CPC ............ *H04W 72/082* (2013.01); *H04B 7/04* (2013.01); *H04B 7/26* (2013.01); *H04J 11/005* (2013.01);
(Continued)

(58) Field of Classification Search
CPC ........... H04W 72/082; H04W 72/0446; H04W 88/08; H04W 88/02; H04J 11/005; H04B 7/04; H04B 7/26
See application file for complete search history.

(56) References Cited

U.S. PATENT DOCUMENTS 9,674,846 B2 *   6/2017   Wang ................... H04B 7/024
2009/0180454 A1   7/2009   Au et al.
(Continued)

FOREIGN PATENT DOCUMENTS

WO    2014042684    3/2014

OTHER PUBLICATIONS

PCT International Application No. PCT/KR2014/007568, Written Opinion of the International Searching Authority dated Apr. 27, 2015, 19 pages.
(Continued)

*Primary Examiner* — Ian N Moore
*Assistant Examiner* — Justin T Van Roie
(74) *Attorney, Agent, or Firm* — Lee, Hong, Degerman, Kang & Waimey

(57) ABSTRACT

Disclosed is a communication method of a terminal utilizing outdated channel information in a two-cell, three-user network environment, the method comprising: transmitting nine different first linear combinations to a first base station in each time slot during a first time interval; receiving a first feedback signal from a second base station which has received the first linear combination as an interference signal; transmitting four different second linear combina-
(Continued)

tions to the first base station during a first sub-time interval of a third time interval; receiving a second feedback signal from the second base station which has received the second linear combinations as an interference signal; and transmitting reconfiguration signals consisting of eight data symbols to the first base station during a third sub-time interval of the third time interval. Further, a communication method of a base station corresponding to such a terminal is also disclosed.

8 Claims, 6 Drawing Sheets

(51) Int. Cl.
| | | |
|---|---|---|
| *H04B 7/04* | (2017.01) | |
| *H04W 72/04* | (2009.01) | |
| *H04J 11/00* | (2006.01) | |
| *H04W 88/02* | (2009.01) | |
| *H04W 88/08* | (2009.01) | |

(52) U.S. Cl.
CPC ........ *H04W 72/0446* (2013.01); *H04W 88/02* (2013.01); *H04W 88/08* (2013.01)

(56) References Cited

U.S. PATENT DOCUMENTS

| | | |
|---|---|---|
| 2013/0258965 A1 | 10/2013 | Geirhofer et al. |
| 2013/0322301 A1 | 12/2013 | Ghauri et al. |
| 2014/0003274 A1* | 1/2014 | Clerckx .............. H04L 25/0204 370/252 |

OTHER PUBLICATIONS

Ali, M. et al., "Completely Stale Transmitter Channel State Information is Still Very Useful," IEEE, Forty-Eighth Annual Allerton Conference, Oct. 2010, 8 pages.

* cited by examiner

COMMUNICATION METHOD USING OUTDATED CHANNEL STATE INFORMATION IN TWO-CELL, K-USER CELLULAR NETWORK

CROSS-REFERENCE TO RELATED APPLICATIONS

This application is the National Stage filing under 35 U.S.C. 371 of International Application No. PCT/KR2014/007568, filed on Aug. 14, 2014, the contents of which are hereby incorporated by reference herein in its entirety.

TECHNICAL FIELD

The present invention is a technology related to a communication method for using outdated channel state information in a UE and a base station in a cellular network environment that two cells exist and several users exist in each cell.

BACKGROUND ART

Interference is one of important factors that reduce performance in a wireless network environment. This interference problem mainly occurs in a multi-user environment that transmission-reception pairs exist. This is because that signals simultaneously transmitted from each transmitter are also transferred to non-intended receivers. A technique of interference alignment (IA) has received much attention as a potential method for solving the interference problem. The technique of interference alignment has been developed under a model of an interference channel between X-channel and K-user, and has been developed for a practically-relevant network model related to various actual statues. Particularly, under a cellular network status, a technique of interference alignment, which achieves almost the same performance as degree of freedom (DoF) performance in an interference-free status, has been developed.

Although these techniques of interference alignment have been contributed to increase of communication capacity, various problems exist to apply the techniques to the actual environment. One of the problems is that a transmitter should exactly know current channel state information (CSI). In a frequency division duplex (FDD) communication system of the related art, this channel information is generally fed back from a receiver to the transmitter. In this case, delay additionally occurs to receive the feedback. Therefore, in a communication system of the related art, current channel information is predicted based on outdated channel state information (outdated CSI) and then a technique of interference alignment based on the predicted channel information has been applied. However, in a fast-fading scenario in which a channel environment is fast changed, a current channel state may completely be different from a channel state predicted from the feedback. In this case, a method for predicting a current channel state is failed to improve communication capacity (improve DoF gain).

However, according to the result published in the paper suggested by Maddah-Ali and Tse, communication capacity could be improved even with outed channel state information in a multi-antenna broadcast channel Particularly, these people have developed an innovative transmission method. This technique may considerably increase communication capacity by combining the past received signals in each receiver to generate assistance signals and transmitting the generated signals to several receivers at the same time.

DISCLOSURE

Technical Problem

The multi-antenna broadcast channel described as above represents a single cell downlink scenario only. Therefore, in a general status of a cellular network, whether communication capacity can be increased with outdated channel state information has not been revealed. Particularly, unlike the multi-antenna broadcast channel, under a cellular network uplink scenario, antennas are distributed at different locations of a transmitter. Therefore, the transmitter cannot reconfigure assistance signals at the same time by combining the past received signals in each receiver. This is because that respective antennas of respective transmitters are distributed and cannot access signals transmitted from the other transmitters when each transmitter reconfigures assistance signals for several receivers at the same time.

Technical Solution

A technique suggested to solve the above technical problem is a transmission method for increasing communication capacity through outdated channel state information in a cellular network status. Herein, a technique developed by a 2-cell, 2-user unlink scenario, which is generalized to a 2-cell, K-user uplink (K≥3) scenario, will be introduced.

Advantageous Effects

According to the embodiments of the present invention, the following effects may be expected.

First of all, higher performance can be achieved for all users K than a case that CSI has not been used (DoF=1).

Secondly, if the number K of users is increased, higher performance (DoF) may be achieved. As a result, communication capacity may be increased when outdated channel state information is used in various cellular network scenarios.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

BRIEF DESCRIPTION OF THE DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

MODE FOR CARRYING OUT THE INVENTION

Figure 1:
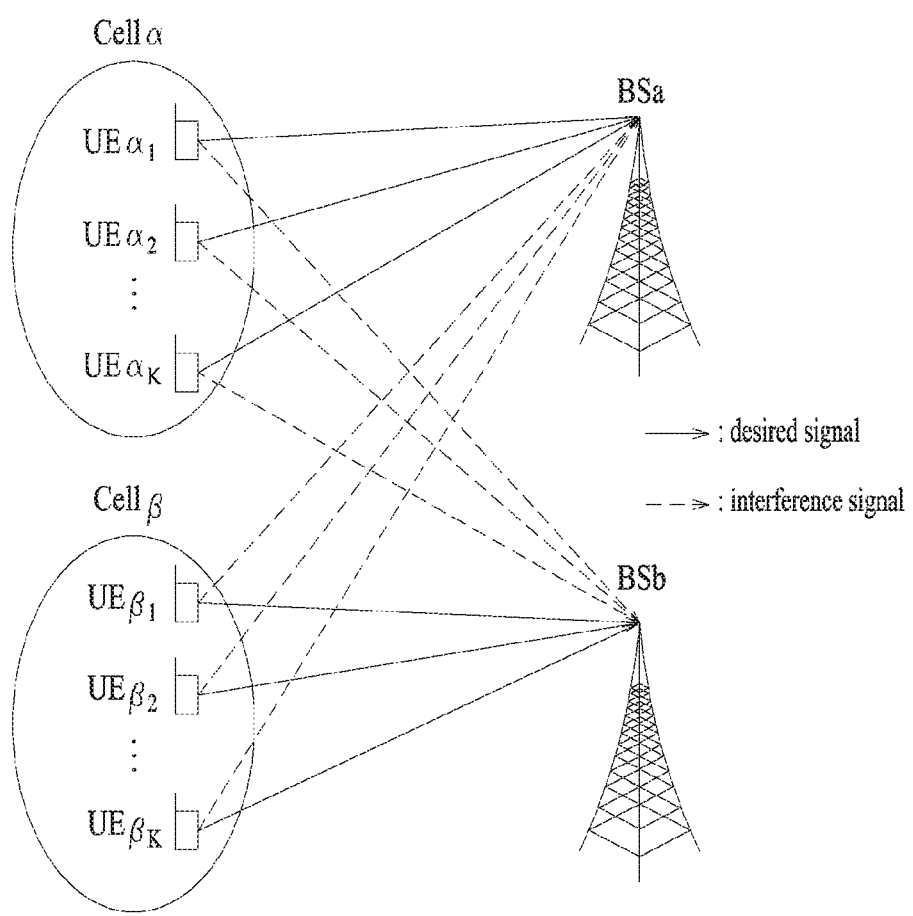
FIG. 1 is a diagram showing a 2-cell, K-user uplink channel model in relation to the present invention.

To solve the technical problem, a communication method comprises the steps of transmitting nine different first linear combinations for 7 data symbols to a first BS at each time slot for a first time period that includes 9 time slots; receiving a first feedback signal for the first linear combinations from a second BS which has received the first linear combinations as interference signals for the first time period; transmitting four different second linear combinations for 6 data symbols to the first BS for a first sub-time period of a third time period, which includes 4 time slots; receiving a second feedback signal for the second linear combinations from the second BS which has received the second linear combinations as interference signals for the first sub-time period; and transmitting reconfiguration signals generated based on the second feedback signal and comprised of eight data symbols to the first BS at each time slot for a third sub-time period of the third time period, which includes 8 time slots, wherein the second linear combinations are generated using the first feedback signal, and are signals related to the first UE only among the signals received by the first BS from three UEs included in the first cell for the first time period, and the first feedback signal includes information on a channel coefficient between the first UE and the second BS for the first time period, and the second feedback signal includes information on a channel coefficient between the first UE and the second BS for the first sub-time period.

The communication method may further comprise the step of repeating the step of transmitting the first linear combinations to the first BS and the step of receiving the first feedback signal a total of three times, wherein the repeating step may perform the corresponding steps by changing the 7 data symbols per repetition.

The step of transmitting the second linear combinations to the first BS, the step of receiving the second feedback signal and the step of transmitting the reconfiguration signals to the first BS may be repeated a total of two times for the third time period for a total of three repetition times.

The reconfiguration signals may include a null space vector for the second UE or the third UE.

The three UEs included in the first cell may do not transmit any data for a second time period that includes 9 time slots.

To solve the technical problem, another communication method comprises the steps of respectively receiving nine different first linear combinations for 7 data symbols from three UEs included in a first cell, at each time slot for a first time period that includes 9 time slots; receiving linear combinations transmitted from three UEs included in a second cell to a second BS as first interference signals at each time slot for a second time period that includes 9 time slots; respectively transmitting first feedback signals for the first interference signals to the three UEs included in the second cell; respectively receiving four different second linear combinations for 6 data symbols from first and second UEs included in the first cell at each time slot for a first sub-time period of a third time period, which includes 4 time slots; receiving linear combinations transmitted from the first and second UEs included in the second cell to the second BS as second interference signals at each time slot for a second sub-time period of the third time period, which includes 4 time slots; respectively transmitting second feedback signals for the second interference signals to the first and second UEs included in the second cell; respectively receiving reconfiguration signals generated based on the second feedback signals from the first UE included in the first cell and the first UE included in the second cell and comprised of 8 data symbols at each time slot for a third sub-time period of the third time period, which includes 8 time slots; and decoding the second linear combinations using the reconfiguration signals and decoding the first linear combinations using the decoded result of the second linear combinations, wherein the second linear combinations are generated using the first feedback signals, and are signals related to the first and second UEs only included in the first cell among the signals received by the first BS from the three UEs included in the first cell for the first time period, and the first feedback signals may include information on channel coefficients between the first BS and the three UEs of the second cell for the first time period, and the second feedback signals may include information on channel coefficients between the first BS and the three UEs of the second cell for the second sub-time period.

The communication method may further comprise the step of repeating the step of receiving the first linear combinations, the step of receiving the first interference signals and the step of transmitting the first feedback signals a total of three times, wherein data symbols of the first interference signals and the first linear combinations may be changed per repetition.

The communication method may further comprise the step of repeating the third time period a total of three times, wherein the two UEs transmitting and receiving signals to and from the first BS may be changed per repetition.

The reconfiguration signals may only be related to the first UE included in the first cell and the first UE included in the second cell.

Best Mode For Carrying Out The Invention

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. Also, the expression that an element is "connected" or "coupled" to another element may mean electric connection as well as physical connection, and moreover may mean logical connection relation. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc. Particularly, in the present invention, the mobile station may be used to refer to an M2M device.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

The embodiments of the present invention can be supported by the standard documents disclosed in any one of wireless access systems, such as an IEEE 802.xx system, a 3$^{rd}$ Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

FIG. 1 is a diagram showing a 2-cell, K-user uplink channel model in relation to the present invention.

Prior to introduction of a technique in a 2-cell, K-user (K is 3 or more) uplink scenario, a technique in a basic 2-cell, 3-user uplink scenario will be described. Hereinafter, a recursive solution method considering a 2-cell, K-1-user scenario will be suggested to solve the 2-cell, K-user scenario.

A channel model shown in FIG. 1 considers that three users exist in each of two cells. Each of a UE (transmitter) and a BS (receiver) has one antenna. Users of cells a and β respectively transmit signals to BSs 'a' and 'b', and received signal arrived at each BS at a time 't' may be expressed by the following Equation 1.

$$y^a(t) = \sum_{k=1}^{3} h_{\alpha k}^a(t) v_{\alpha k}(t) x_{\alpha k}(t) + \sum_{k=1}^{3} g_{\beta k}^a(t) v_{\beta k}(t) x_{\beta k}(t) + w^a(t)$$

$$y^b(t) = \sum_{k=1}^{3} h_{\beta k}^b(t) v_{\beta k}(t) x_{\beta k}(t) + \sum_{k=1}^{3} g_{\alpha k}^b(t) v_{\alpha k}(t) x_{\alpha k}(t) + w^b(t)$$

Equation 1

In this case, superscript and subscript of each letter indicate a receiver and a transmitter, respectively, and $k \in \{1, 2\}$ indicates user index. $h_{\alpha k}^a \in C$ and $g_{\alpha k}^b \in C$ respectively indicates coefficients of a direct channel (channel from UE to intended BS) and a cross channel (channel from UE to non-intended BS). $v_{\alpha k} \in C^{1 \times n}$ and $x_{\alpha k} \in C^{n \times 1}$ respectively indicate 1×n precoder vector and n×1 vector that includes a random number 'n' of data symbols. $w^a \in C$ indicates complex Gaussian noise. Also, in FIG. 1, the transmitter knows information (channel coefficient) on a channel from a time period 't' to a time period 't−1'. That is, it is assumed that delayed channel state information at the transmitters (CSIT) is acquired. Also, it is assumed that users of all cells and all BSs previously know all precoder vectors.

Hereinafter, received signals in the Equation 1 are expressed per phase. A phase that means a predetermined time period includes a plurality of time slots. The time slot means a time unit for transmitting one data symbol, and the time period (or phase) may include two or more time slots. The data symbol means a transmission unit. At the nth phase, the received signals of the BSs may be expressed as the following Equation 2.

$$y^a[n] =$$

$$\sum_{k=1}^{3} H_{\alpha k}^a[n] V_{\alpha k}[n] x_{\alpha k}[n] + \sum_{k=1}^{3} G_{\beta k}^a[n] V_{\beta k}[n] x_{\beta k}[n] + w^a[n]$$

$$y^b[n] = \sum_{k=1}^{3} H_{\beta k}^b[n] V_{\beta k}[n] x_{\beta k}[n] +$$

Equation 2

$$\sum_{k=1}^{3} G_{\alpha k}^{b}[n]V_{\alpha k}[n]x_{\alpha k}[n] + w^{b}[n]$$

If the n phase includes 9 time slots, a channel coefficient matrix, a precoder matrix, and a transmission data symbol may be expressed as the following Equation 3.

$H_{\alpha k}^{a}[n]=\text{diag}(h_{\alpha k}^{a}(t_1), \ldots, h_{Tk}^{r}(t_4))(9\times 9$ diagonal matrix)

$G_{\alpha k}^{b}[n]=\text{diag}(g_{Tk}^{r}(t_1), \ldots, g_{Tk}^{r}(t_4))(9\times 9$ diagonal matrix)

$V_{\alpha k}[n]=[v_{\alpha k}^{T}(t_1), \ldots, v_{\alpha k}^{T}(t_4)]^{T}(9\times n$ precoder matrix)

$x_{\alpha k}[n](n\times 1$ vector)

Hereinafter, a technique of achieving DoF of 21/17 which is communication capacity better than performance (DoF=1) corresponding to a case that the transmitter has not fed back channel state information by using passed channel state information will be described. The transmission scheme according to one embodiment of the present invention is the scheme that reconfigures assistance signals useful for both BSs 'a' and 'b' by using the past received signals received by the receiver (BSs 'a' and However, as described above, reconfiguration of the signals is restricted because antennas of the users are distributed in different spaces. Therefore, each transmitter cannot reconfigure the assistance signals useful for the two BSs. This is because that the assistance signals useful for the two BSs include a signal transmitted from another transmitter, which cannot be accessed by each transmitter. That is, since each transmitter cannot identify information on the signal transmitted from another transmitter, a method for effectively reconfiguring such a signal will be described in the following embodiment.

Figure 2:
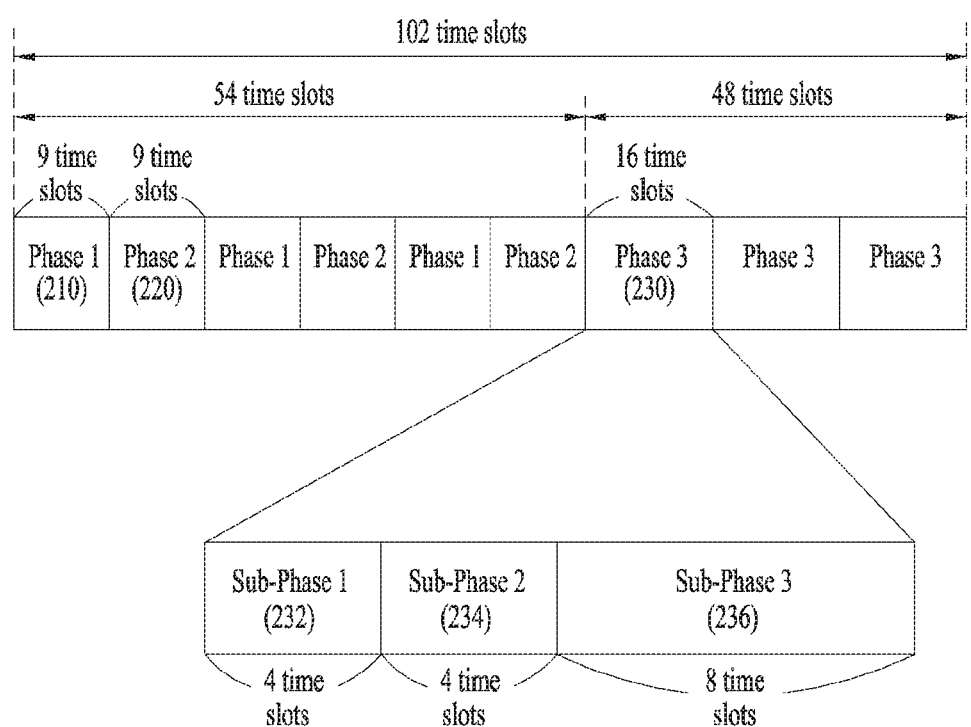
FIG. 2 is a diagram showing a structure of a time domain in relation to one embodiment of the present invention.

FIG. 2 is a diagram showing a structure of a time domain in relation to one embodiment of the present invention. A time structure according to one embodiment of the present invention includes three phases.

First of all, a phase 1 210 includes a total of 9 time slots. In the phase 1, UEs 1, 2 and 3 of a cell α transmit signals, and UEs of a cell β do not transmit any signal. Each UE transmits 7 independent data symbols to 9 time slots in a distributed mode of linear combinations. In this embodiment, the transmission data symbols may be expressed as the following Equation 4.

$$x_{\alpha 1}[1] = \begin{bmatrix} x_{\alpha 11}[1] \\ \vdots \\ x_{\alpha 17}[1] \end{bmatrix},$$ Equation 4

$$x_{\alpha 2}[1] = \begin{bmatrix} x_{\alpha 21}[1] \\ \vdots \\ x_{\alpha 27}[1] \end{bmatrix},$$

$$x_{\alpha 3}[1] = \begin{bmatrix} x_{\alpha 31}[1] \\ \vdots \\ x_{\alpha 37}[1] \end{bmatrix}$$

$$x_{\beta 1}[1] = \begin{bmatrix} 0 \\ \vdots \\ 0 \end{bmatrix},$$

$$x_{\beta 2}[1] = \begin{bmatrix} 0 \\ \vdots \\ 0 \end{bmatrix},$$

$$x_{\beta 3}[1] = \begin{bmatrix} 0 \\ \vdots \\ 0 \end{bmatrix}$$

Since DoF performance is only considered, if noise is disregarded, the signals received from the BSs 'a' and 'b' may be expressed as the following Equation 5.

$$y^{a}[1] = \sum_{k=1}^{3} H_{\alpha k}^{a}[1]V_{\alpha k}[1]x_{\alpha k}[1]$$ Equation 5

$$y^{b}[1] = \sum_{k=1}^{3} G_{\alpha k}^{b}[1]V_{\alpha k}[1]x_{\alpha k}[1]$$

In the Equation 5, $v_{\alpha 1}$ and $v_{\alpha 2}$ indicate 9×7 precoder matrixes of rank 3, and serve to allow each user to distribute 7 signals to 9 time slots in a distributed mode of linear combinations. As noted from the above Equation, the base stations 'a' and 'b' receive 9 linear equation type signals that include 21 variables (independent data symbols) from three UEs located at the cell α. Meanwhile, if the cell a desires to decode 21 data symbols transmitted from the UEs 1, 2 and 3 from the received signals, the BS 'a' needs 12 additional linear equation type signals independent from the previously received signals.

Meanwhile, at the phase 1, the signals are arrived in the BS 'b' as well as the BS 'a'. That is, the BS 'b' overhears the signals transmitted from the UEs of the cell a to the BS 'a' and receives the signals as interference signals. Although the signals are transferred from the cell a allocated to the BS 'a', the BS 'b' stores the received signals for future.

In the same manner as the phase 1, the phase 2 220 includes 9 time slots. The UEs 1, 2 and 3 located at the cell transmit the signals to the BS 'b' symmetrically to the phase 1. On the other hand, the UEs of the cell c. do not transmit any signal. Each UE of the cell simultaneously transmits 7 new data symbols, which are independent from one another, to 9 time slots in a distributed mode of linear combinations. In the phase 2, the signals received by the BSs 'a' and 'b' by disregarding noise may be expressed as the following Equation 6.

$$y^{a}[2] = \sum_{k=1}^{3} G_{\beta k}^{a}[2]V_{\beta k}[2]x_{\beta k}[2]$$ Equation 6

$$y^{b}[2] = \sum_{k=1}^{3} H_{\beta k}^{b}[2]V_{\beta k}[2]x_{\beta k}[2]$$

In the same manner as the phase 1, the BSs 'a' and 'b' receive 9 linear equation type signals that include 21 variables (independent data symbols) from three UEs located at the cell β. If the BS 'b' desires to decode 21 data symbols transmitted from the UEs 1, 2 and 3, the BS 'b' needs 12 additional linear equation type signals independent from the previously received signals.

Meanwhile, even at the phase 2, the signals are arrived in the BS 'a' as well as the BS 'b'. That is, the BS 'a' overhears the signals transmitted from the UEs of the cell β to the BS 'b' and receives the signals as interference signals. Although the signals are transferred from the cell β allocated to the BS the BS 'a' stores the received signals for future.

In the suggested embodiment, the transmitter reconfigures the assistance signals useful for both the BSs 'a' and 'b' by using the signals previously received by the receiver. However, the signals previously received by the BSs at the phase 1 and the phase 2 exist in a linear combination type of the data symbols of the UEs 1, 2 and 3 of each cell. If these signals are used, each transmitter cannot reconfigure the signals received by the BSs. This is because that one user cannot access the symbol transmitted from another user and thus cannot know information on data symbols of another user.

At the phases 1 and 2, each UE of each cell has consumed 9 time slots to transmit 7 data symbols. This is to enable a nulling process. That is, the BS 'b' may discover two null space vectors $u_{\alpha 11}$ and $u_{\alpha 12}$, which satisfy the following Equation 7, from the signals received from the UE1 of the cell α.

$$u_{\alpha 11}{}^T G_{\alpha 1}{}^b[1]V_{\alpha 1}[1]x_{\alpha 1}[1]=0$$

$$u_{\alpha 12}{}^T G_{\alpha 1}{}^b[1]V_{\alpha 1}[1]x_{\alpha 1}[1]=0 \quad \text{Equation 7}$$

Likewise, the BS 'b' may discover four null space vectors $u_{\alpha 21}$, $u_{\alpha 22}$, $u_{\alpha 31}$ and $u_{\alpha 22}$, which satisfy the following Equation 8, from the signals received from the UE2 and the UE3 of the cell α.

$$u_{\alpha 21}{}^T G_{\alpha 2}{}^b[1]V_{\alpha 2}[1]x_{\alpha 2}[1]=0, \ u_{\alpha 22}{}^T G_{\alpha 2}{}^b[1]V_{\alpha 2}[1]x_{\alpha 2}[1]=0$$

$$u_{\alpha 31}{}^T G_{\alpha 3}{}^b[1]V_{\alpha 3}[1]x_{\alpha 3}[1]=0, \ u_{\alpha 32}{}^T G_{\alpha 3}{}^b[1]V_{\alpha 3}[1]x_{\alpha 3}[1]=0 \quad \text{Equation 8}$$

If the phase 2 ends, the BS 'b' may acquire the following 6 Equations 9 by generating null space vectors for the interference signals (signals which are received although not desired to be decoded by the BS) received at the phase 1. The Equation 9 may be acquired by multiplication of two null space vectors for the signals received by the BS 'b' from each user and all received signals. The BS 'b' stores the following Equation 9 as side information.

$$u_{\alpha 1i}{}^T y^b[1]=u_{\alpha 1i}{}^T G_{\alpha 2}{}^b[1]V_{\alpha 2}[1]x_{\alpha 2}[1]+u_{\alpha 1i}{}^T G_{\alpha 3}{}^b[1]V_{\alpha 3}[1]x_{\alpha 3}[1], \ i \in \{1,2\}$$

$$u_{\alpha 2i}{}^T y^b[1]=u_{\alpha 2i}{}^T G_{\alpha 1}{}^b[1]V_{\alpha 1}[1]x_{\alpha 1}[1]+u_{\alpha 2i}{}^T G_{\alpha 3}{}^b[1]V_{\alpha 3}[1]x_{\alpha 3}[1], \ i \in \{1,2\}$$

$$u_{\alpha 3i}{}^T y^b[1]=u_{\alpha 3i}{}^T G_{\alpha 1}{}^b[1]V_{\alpha 1}[1]x_{\alpha 1}[1]+u_{\alpha 3i}{}^T G_{\alpha 2}{}^b[1]V_{\alpha 2}[1]x_{\alpha 2}[1], \ i \in \{1,2\}$$

Referring to the signals of the above Equation 9, it is noted that the respective equations are comprised of symbols received from two users. For example, in $u_{\alpha 1i}{}^T y^b[1]$, $u_{\alpha 2i}{}^T G_{\alpha 2}{}^b[1]V_{\alpha 2}[1]x_{\alpha 2}[1]$ are symbols for the user 2 of the cell x, and $u_{\alpha 1i}{}^T G_{\alpha 3}{}^b[1]V_{\alpha 3}[1]x_{\alpha 3}[1]$ are symbols for the user 3 of the α. In this way, in the Equation 9, each side information is expressed by the symbols for the two users. The symbols related to a total of three users located at the cell are expressed as a total of 12 terms through a process of applying two null space vectors (i=1, 2). Similarly, the BS 'a' generates the following Equation 10 and stores the generated Equation as side information by using the null space vectors for the interference signals received from the cell β.

$$u_{\beta 1i}{}^T y^a[2]=u_{\beta 1i}{}^T G_{\beta 2}{}^a[2]V_{\beta 2}[2]x_{\beta 2}[2]+u_{\beta 1i}{}^T G_{\beta 3}{}^a[2]V_{\beta 3}[2]x_{\beta 3}[2], \ i \in \{1,2\}$$

$$u_{\beta 2i}{}^T y^a[2]=u_{\beta 2i}{}^T G_{\beta 1}{}^a[2]V_{\beta 1}[2]x_{\beta 1}[2]+u_{\beta 2i}{}^T G_{\beta 3}{}^a[2]V_{\beta 3}[2]x_{\beta 3}[2], \ i \in \{1,2\}$$

$$u_{\beta 3i}{}^T y^a[2]=u_{\beta 3i}{}^T G_{\beta 1}{}^a[2]V_{\beta 1}[2]x_{\beta 1}[2]+u_{\beta 3i}{}^T G_{\beta 2}{}^a[2]V_{\beta 2}[2]x_{\beta 2}[2], \ i \in \{1,2\} \quad \text{Equation 10}$$

Likewise, the respective Equations of the Equation 10 are signals comprised of symbols received from two users. In this case, it is noted that the equations of the Equations 9 and 10 cannot be reconfigured by each user at the phase 3 230.

Instead, each user may reconfigure a term related to one user only at the phase 3, and symbols for this term are linearly independent from the signals received by each BS at the phases 1 and 2. In this way, if 12 terms are reconfigured in the Equation 9 and transmitted, the BS 'a' may decode all data symbols. Likewise, this process may similarly be applied to the Equation 10, whereby a total of 24 symbols may be reconfigured and transmitted. Therefore, the BS 'a' may additionally acquire 12 signals for one user in the Equation 9 among the signals received by the BS 'b' at the phase 1, wherein these 12 signals are linearly independent from the 9 signals (since 3 users transmit a total of 21 symbols at a total of 9 time slots) arrived in the BS 'a' at the phase 1. Therefore, these 12 signals configure a total of 21 linearly independent signals together with the 9 signals received by the BS 'a' at the phase 1, and the BS 'a' decodes a total of 21 symbols. Likewise, the BS 'b' additionally acquires 12 signals for one user in the Equation 10 among the signals received at the phase 2, wherein these 12 signals are linearly independent from the 9 signals arrived in the BS 'b' at the phase 2. Therefore, these 12 signals configure a total of 21 linearly independent signals together with the 9 signals received by the BS 'b' at the phase 2, and the BS 'b' may decode a total of 21 symbols. As a result, the two BSs 'a' and 'b' may decode a total of 42 (6 users transmit 7 symbols) data symbols.

Therefore, an object of the phase 3 230 is related to a method how the reconfigured signals are effectively transmitted to the BS. Prior to the phase 3, the phase 1 and the phase 2 are repeated three times. Since each phase includes 9 time slots, a total of 54 time slots are finally used, and 7 data symbols transmitted by each UE of the cell α: are newly configured. Likewise, whenever the phase 2 is repeated, 7 data symbols transmitted by each UE of the cell β are newly configured. Therefore, a total of 42×3=126 data symbols are transmitted to the BS for 54 time slots.

Hereinafter, a procedure of transmitting a total of 24×3=72 reconfiguration signals for decoding 126 data symbols at the phase 3 for 48 time slots will be described.

The phase 3 230 is repeated a total of three times, and each phase 3 includes 16 time slots. At the phase 3, the UEs reconfigures and transmits signals comprised of a term related to one user only without transmitting new data symbols. First of all, among the signals stored by the BSs 'a' and 'b' as side information, the signals related to the users 1 and 2 are 4×3=12 (as the phases 1 and 2 are repeated three times, 6 BSs 'a' and 6 BSs 'b' exist). The 12 signals stored as side information are represented by a sum of two terms. These terms are related to one user only, and 24 terms are included in the side information. Hereinafter, a method for effectively transferring 24 terms of a single user from a UE will be described.

The phase 3 comprised of 16 time slots which are repeated 3 times (a total of 49 time slots), and each phase 3 includes 3 sub-phases.

First of all, the status that UEs 1 and 2 exist in each cell is considered. A method for transferring signals comprised of other two users (case of UEs 2 and 3 and case of UEs 1 and 3) may symmetrically be applied to the status. Therefore, a 2-cell, 2-user scenario is considered during the process of solving the 2-cell, 3-user problem. However, this scenario is different from the general 2-cell, 2-user scenario in that each BS previously has symbols to be transmitted from each cell to the BS as side information (Equations 9 and 10).

The sub-phase 1 232 includes a total of 4 time slots. At the sub-phase 1, the users 1 and 2 at the cell α transmit signals, whereas the users of the cell β do not transmit any signal. The users transmit 12 symbols (6 symbols are applied to each of users 1 and 2) for one user, among the side information previously calculated by the BS 'b', to 4 time slots in a distributed mode of linear combinations. Since DoF performance is considered, the signals received by the BSs 'a' and 'b' by disregarding noise may be expressed as the following Equation 11.

$$y^a[1] = \sum_{k=1}^{2} H_{\alpha k}^a[3_1] V_{\alpha k}[3_1] y_{\alpha k}[3_1]$$

$$y^b[1] = \sum_{k=1}^{2} G_{\alpha k}^b[3_1] V_{\alpha k}[3_1] y_{\alpha k}[3_1]$$

Equation 11

In the Equation 11, $V_{\alpha 1}$ and $V_{\alpha 2}$ indicate 4×1 precoder matrixes of rank 4, and serve to distribute 12 signals transmitted from each user to 4 time slots in a distributed mode of linear combinations. As noted from the Equation 11, both the BSs 'a' and 'b' receive 4 linear equations that include 6 variables (independent data symbols) from the cell α.

Meanwhile, to decode 12 symbols transmitted from the users 1 and 2 of the cell α, the BS 'a' needs 8 additional linear equations independent from the signals originally arrived thereto. At the sub-phase 1, the same data symbols are received in the BS 'b' as well as the BS 'a' as the interference signals, and the BS 'b' stores the signals received from the cell α for future. In another aspect, it should be noted that the BS 'b' has already 5 signals independent from the signals received at the sub-phase 1 of the phase 3. These signals are the signals for the users 1 and 2 of the cell α, which are calculated for the signals received at the phase 1 (repeated three times) through nulling (a total of 6 signals obtained by being repeated for 2 three times). Therefore, new matrixes for expressing $p_{\alpha 1}^b$, $p_{\alpha 2}^b$ for expressing $y_{\alpha k}[3_1]$ as $p_{\alpha 1}^b y_{\alpha k}[3_1] + p_{\alpha 2}^b y_{\alpha k}[3_1]$ may be configured from all the signals, and are expressed as the following Equation 12.

$$p_{\alpha 1}^b = \frac{G_{\alpha 1}^b[3_1] V_{\alpha 1}[3_1]}{I_{6\times 6}}, (10 \times 6 \text{ precoder matrix})$$

$$p_{\alpha 2}^b = \frac{G_{\alpha 1}^b[3_1] V_{\alpha 1}[3_1]}{I_{6\times 6}}, (10 \times 6 \text{ precoder matrix})$$

Equation 12

Since $p_{\alpha 1}^b, p_{\alpha 2}^b$ corresponds to rank 6, if nulling is performed for each of $p_{\alpha 1}^b$, $p_{\alpha 2}^b$ using four different vectors, a total of four terms having symbols of one user may be generated, whereby a total of 8 terms may be generated. The BS 'b' generates 8 terms having symbols of one user and stores the generated terms.

The sub-phase 2 234 includes 4 time slots in the same manner as the sub-phase 1. Symmetrically to the sub-phase 1, the users 1 and 2 of the cell 3 transmit signals, whereas the users of the cell α do not transmit any signal. The respectively users of the cell β simultaneously transmit 12 symbols (6 symbols for each of the users 1 and 2), which are signals for one user, among the side information previously stored in the BS 'a', to 4 time slots in a distributed mode of linear combinations.

Meanwhile, to decode 12 data symbols transmitted from the users 1 and 2 of the cell β the BS 'b' needs 8 additional linear equations independent from the signals originally arrived thereto. Also, in the same manner as the sub-phase 1, the BS 'a' may generate and store 8 signals comprised of one user only by configuring $P_{\beta 1}^a$, $P_{\beta 2}^a$ and performing nulling.

The sub-phase 3 236 includes 8 time slots. At the sub-phase 3, users of each cell reconfigure side information stored by the BSs at the sub-phase 1 and the sub-phase 2 one by one and simultaneously transmit the reconfigured side information. For example, at the sub-phases 1 and 2, if the BS 'b' stores $L_{\alpha 1}$ and the BS 'a' stores $L_{\beta 1}$, the users 1 of the cell α and the cell β reconfigure $L_{\alpha 1}$ and $L_{\beta 1}$ for one time slot and transmit the reconfigured information at the same time. If noise is disregarded, the signals received from the BSs 'a' and 'b' are expressed as the following Equation 13.

$$y^a(9') = h_{\alpha 1}^a(9') L_{\alpha 1} + g_{\beta 1}^a(9') L_{\beta 1}$$

$$y^b(9') = h_{\beta 1}^b(9') L_{\beta 1} + g_{\alpha 1}^b(9') L_{\alpha 1}$$

Equation 13

In the Equation 13, 9' means the 9th time slot within the phase 3. That is, the first time slot of the sub-phase 3 236, at which the users 1 of the cell α and the cell β respectively transmit $L_{\alpha 1}$ and $L_{\beta 1}$, becomes the 9th time slot at the phase 3. Meanwhile, the BS 'a' may obtain $L_{\alpha 1}$ from a signal $y^a(9')$. This is because that the BS 'a' calculates and stores $L_{\beta 1}$ at the end of the sub-phase 2 as described above (because each BS knows information on the past channel coefficient through feedback). Likewise, the BS 'b' also obtains $L_{\beta 1}$ from $y^b(9')$. As a result, the BSs 'a' and 'b' simultaneously obtain one additional linear independent equation for decoding 12 data symbols, thereby decoding a total of 24 data symbols.

Since a total of 8 additional linear equations are required to decode 12 data symbols, 8 time slots are used at the sub-phase 3 to transmit a total of 8 linear independent signals. Therefore, the phase 1 210 and the phase 2 220 are repeated and at the same time 24 signals for one user, which are generated by each BS, may be transferred successfully using 16 time slots at the phase 3 230.

A method for transferring signals comprised of two other users (case of users 2 and 3 and case of users 1 and 3) may be applied symmetrically. As a result, each BS transfers 72 linear independent equations by using 48 time slots. As described with reference to the Equation 10, each BS acquires 54 existing equations and 72 linear independent equations. These equations become the equations which are sufficient to decode 126 symbols at the same time by means of the BSs 'a' and 'b'. Therefore, each BS may decode all data symbols successfully. Since 126 symbols have been transmitted using a total of 54+48=102 times slots, DoF of 126/102=21/17 may be achieved.

When the 2-cell, K-user scenario is enlarged based on the above description, DoF may be expressed through the following two Equations 14.

$$DoF(2, K) = \frac{K^2 - K + 1}{1 + \frac{(K-1)^2}{DoF_{side}(2, K-1)}}$$ Equation 14

$$DoF_{side}(2, K) = \frac{K^2 - K + 1}{1 + \frac{K(K-1)}{DoF_{side}(2, K-1)}}$$

DoF(2, K) indicates performance (DoF) in the 2-cell, K-user, and $DoF_{side}(2,K)$ indicates performance corresponding to the case that each BS has the aforementioned type side information.

Figure 3:
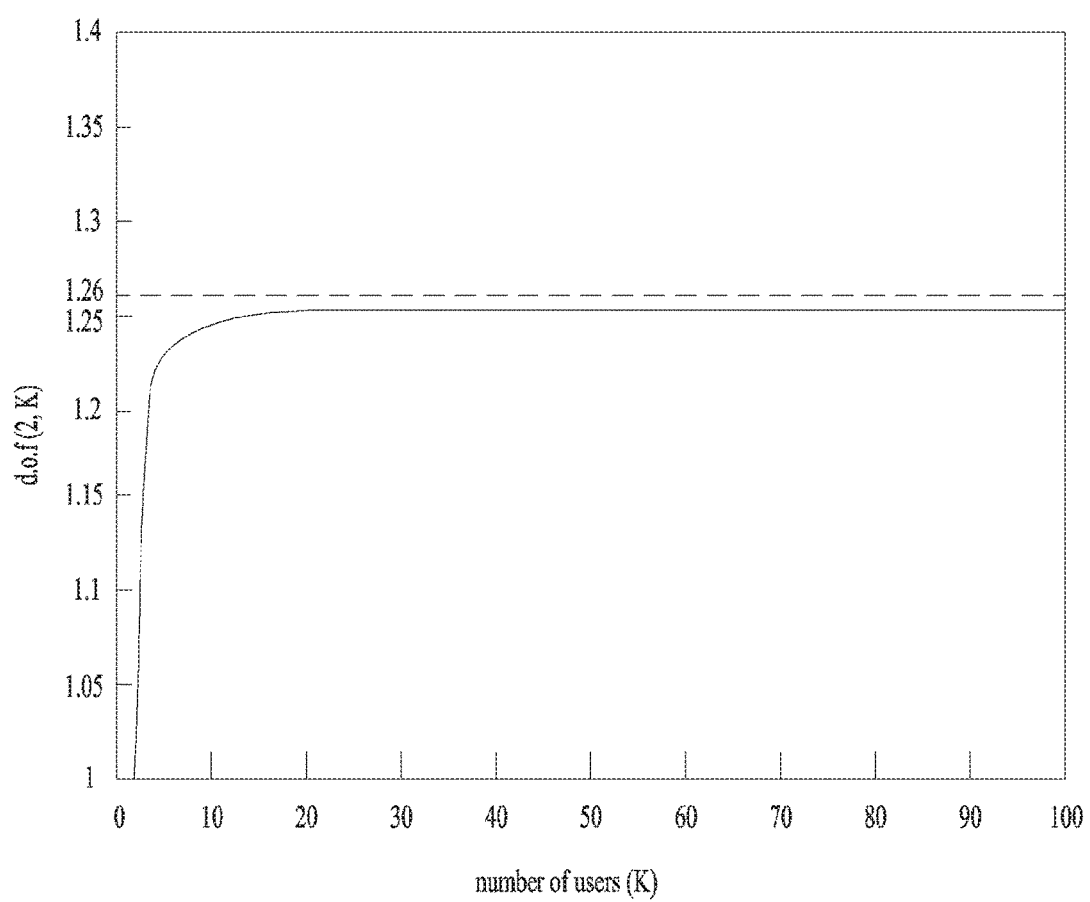
FIG. 3 is a graph showing a relationship between the number of users and DoF in relation to the present invention.

FIG. 3 is a graph showing a relationship between the number of users and DoF in relation to the present invention. In FIG. 3, performance of the number K of users is shown through the Equation 14.

As noted from FIG. 3, higher performance for the number K of all users may be achieved than the case that channel state information has not been fed back (DoF=1), whereby it is noted that a technique for achieving higher performance as the number K of users is increased has been developed.

Meanwhile, according to one embodiment, the BS may set a random threshold value for DoF and calculate a value of the number K of users, which satisfies the corresponding DoF. If the number K of users is determined, the BS may schedule UEs as much as K in each cell. Therefore, if a communication environment is good, the threshold value of DoF is set to a high value to schedule more UEs at one time, whereby communication throughput may be improved. On the contrary, if the communication environment is not good, a small number of UEs may be scheduled to simplify scheduling and computational complexity.

Figure 4:
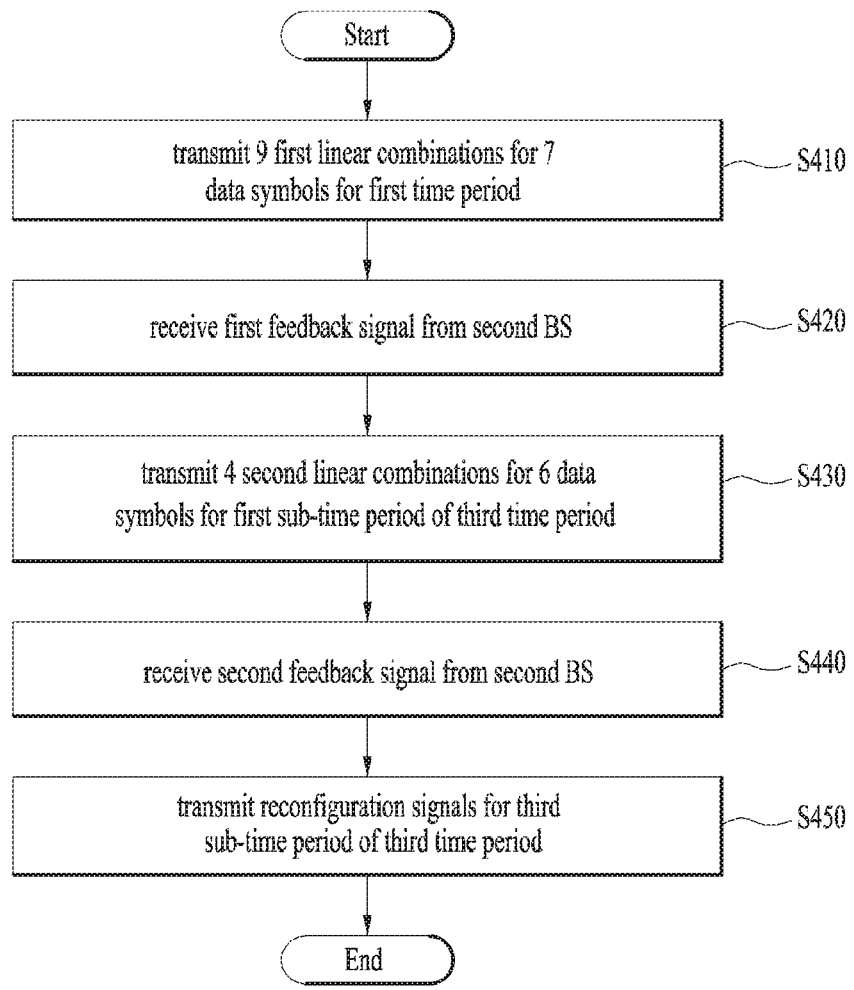
FIG. 4 is a diagram showing a communication method using outdated channel state information in a UE in relation to one embodiment of the present invention.

FIG. 4 is a diagram showing a communication method using outdated channel state information in a UE in relation to one embodiment of the present invention. Hereinafter, although the communication method will be described based on the first UE (UE 1) included in the cell α, the corresponding description may similarly be applied to UEs of the cell β as well as the other UEs of the cell α. For convenience of description, the cells α and β will be referred to as the first cell and the second cell, respectively, and the BSs 'a' and 'b' will be referred to as the first BS and the second BS. Three UEs included in each cell will be referred to as the first UE, the second UE and the third UE.

The first UE included in the first cell transmits 7 data symbols to the first BS for a first time period (that is, phase 1), which includes 9 time slots, by distributing the data symbols into 9 linear combinations (S410). Also, in addition to the first UE, the second UE and the third UE included in the first cell also transmit data symbols to the first BS for the first time period.

Meanwhile, the data symbols transmitted from the first UE to the first BS are overheard by the second BS. That is, the second BS receives the data symbols transmitted to the first BS as interference signals. The second BS generates a first feedback signal for the received interference signals, wherein the first feedback signal may include information on a channel coefficient between the first UE and the second BS for the first time period. The second BS transmits the first feedback signal to the first UE, and the first UE receives the first feedback signal (S420).

Subsequently, the first UE does not transmit any signal for the second time period (phase 2) that includes 9 times slots. For the second time period, the three UEs included in the second cell transmit the data symbols to the second BS.

Similarly to the first time period, the data symbols transmitted from the UEs of the second cell to the second BS are overheard by the first BS and thus received in the first BS as interference signals.

The first UE repeats the aforementioned steps for the first time period and the second time period and thus performs the aforementioned steps a total of three times. The data symbols transmitted to the first BS are changed per repeated steps, whereby the feedback signal received from the second BS is also changed.

Subsequently, the third time period (phase 3) includes three sub-time periods as described above. At each time slot for the first sub-time period, which includes four time slots, among the three sub-time periods, the first UE transmits four different second linear combinations for 6 data symbols to the first BS (S430).

The second linear combinations are signals generated using the first feedback signal received before, and the first UE may generate the second linear combinations by reconfiguring the first linear combinations transmitted therefrom from channel coefficient information included in the first feedback signal. The second linear combinations are signals related to the first UE only, among the signals received by the first BS from the three UEs of the first cell for the first time period. That is, the first UE may configure the second linear combinations from the first linear combinations transmitted therefrom to the first UE three times. Likewise, the second UE simultaneously transmits the second linear combinations to the first BS for the first sub-time period of the third time period.

The second BS receives the second linear combinations as interference signals while the first UE and the second UE are transmitting the second linear combinations to the first BS for the first sub-time period. Therefore, the second BS generates a second feedback signal for the second linear combinations and transmits the second feedback signal to each of the first UE and the second UE (S440). The second feedback signal may include information on channel coefficients between the first and second UEs and the second BS for the first sub-time period.

The first UE generates reconfiguration signals, which include 8 data symbols, on the basis of the second feedback signal received from the second BS. Subsequently, the first UE transmits the reconfiguration signals to the first BS at each time slot for the third sub-time period that includes 8 time slots (S450).

The reconfiguration signals transmitted from the first UE may include a null space vector for the second UE or the third UE. That is, the reconfiguration signals are generated by configuring the signals related to the first UE only using the second feedback signal, and the reconfiguration signals related to the first UE only may be generated using the null space vector for the second UE or the null space vector for the third UE.

The aforementioned steps for the third time period are repeated a total of three times. The first UE transmits the reconfiguration signals two times during repetition of the three times. That is, the first UE-the second UE transmit the reconfiguration signals during the first repetition, and the third UE-the first UE transmit the reconfiguration signals during the third repetition.

Figure 5:
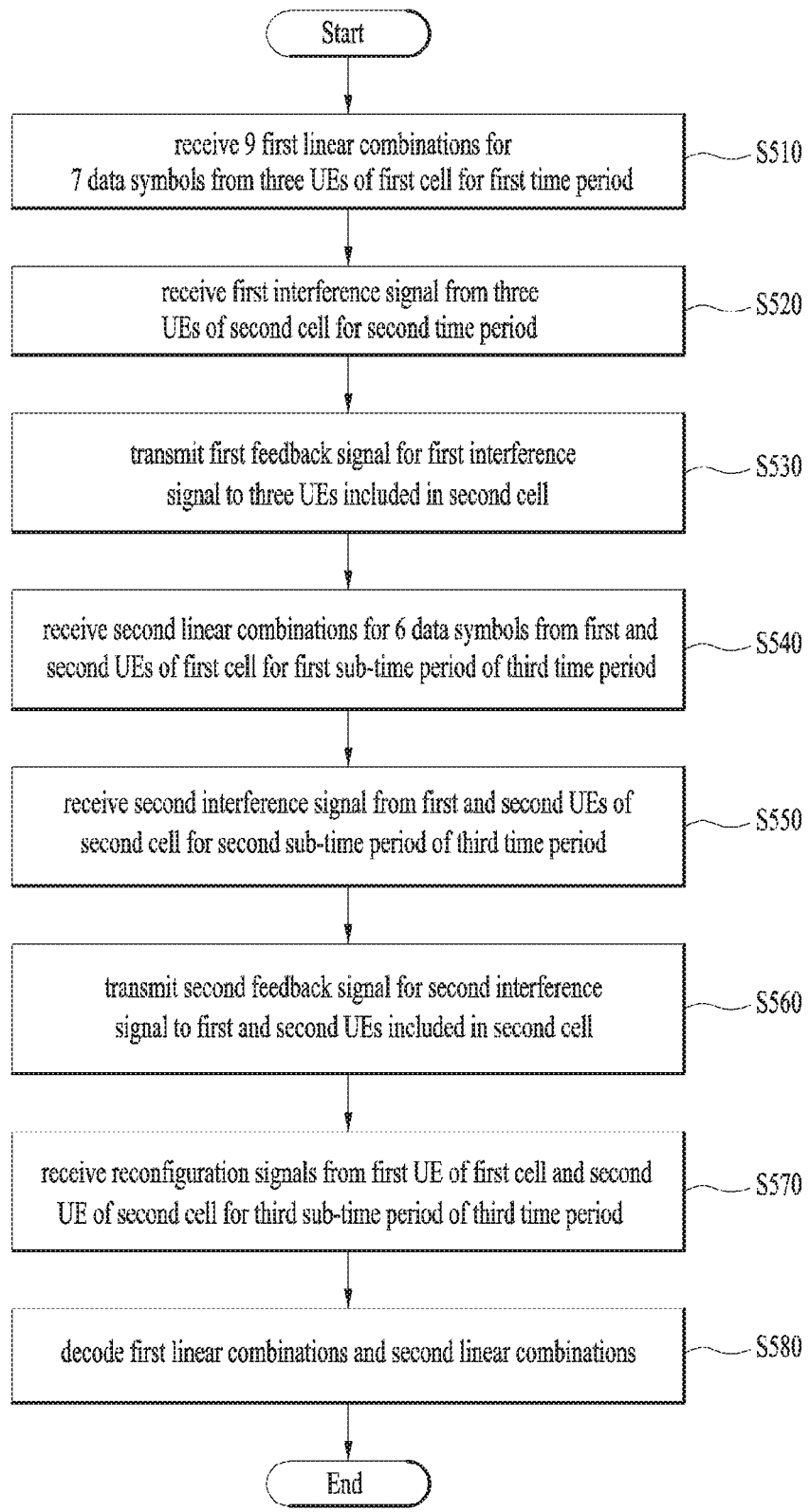
FIG. 5 is a diagram showing a communication method using outdated channel state information in a base station in relation to one embodiment of the present invention.

FIG. 5 is a diagram showing a communication method using outdated channel state information in a base station in relation to one embodiment of the present invention. Hereinafter, although the communication method will be described based on the first BS, the corresponding description may similarly be applied to the second BS.

The first BS receives 9 linear combinations from three UEs of the first cell for the first time period (S510). 7 data symbols may be distributed to 9 linear combinations and transmitted per time slot. Meanwhile, for the first time period, the second BS receives the signals, which are transmitted from the three UEs of the first cell to the first BS, as interference signals.

For the second time period, the three UEs of the second cell transmit linear combinations of the data symbols to the second BS. For the second time period, the first BS receives the interference signals by overhearing the linear combinations transmitted to the second BS (S520). Subsequently, the first BS generates a first feedback signal for the interference signals and feeds back the generated signal to the three UEs included in the second cell (S530). As described above, the first feedback signal may include information on channel coefficients between the first BS and the UEs of the second cell for the second time period.

Meanwhile, as described above, the operations of the first time period and the second time period may be repeated a total of three times. Also, the first linear combinations received during the repeated steps are continuously changed, and the data symbols received from the UEs of the second cell are also changed.

Subsequently, for the first sub-time period of the third time period, the first BS receives second linear combinations from two UEs (for example, the first UE and the second UE) of the first cell (S540). Four different second linear combinations for 6 data symbols may be received, and the second linear combinations may be signals generated by the first feedback signal and related to each UE only.

Similarly, for the second sub-time period of the third time period, the two UEs of the second cell transmit the second linear combinations to the second BS. The first BS receives the second linear combinations transmitted to the second BS as second interference signals (S550), and transmits a second feedback signal for the second interference signals each of to the first UE and the second UE, which are included in the second cell (S560). The second feedback signal may include information on channel coefficients between the first BS and the two UEs of the second cell for the second sub-time period.

Subsequently, for the third sub-time period of the third time period, the first BS receives reconfiguration signals, which are comprised of 8 data symbols, from the first UE of the first cell and the first UE of the second cell for 8 time slots (S570). The reconfiguration signals are generated on the basis of the second feedback signal. The reconfiguration signals related to the first UE only of each cell may be generated using a null space vector for the second UE or a null space vector for the third UE.

The aforementioned steps for the first, second and third sub-time periods of the third time period are repeated a total of three times. That is, the reconfiguration signals are received from the first UE-the second UE during the first repetition, received from the second UE-the third UE during the second repetition, and received from the third UE-the first UE during the third repetition. Through the repetition of three times, the first BS may acquire data symbols sufficient to decode the first linear combinations and the second linear combinations.

First of all, the first BS decodes the second linear combinations by using the received reconfiguration signals. Subsequently, the first BS may decodes the first linear combinations from the decoding result of the second linear combinations (S580).

Figure 6:
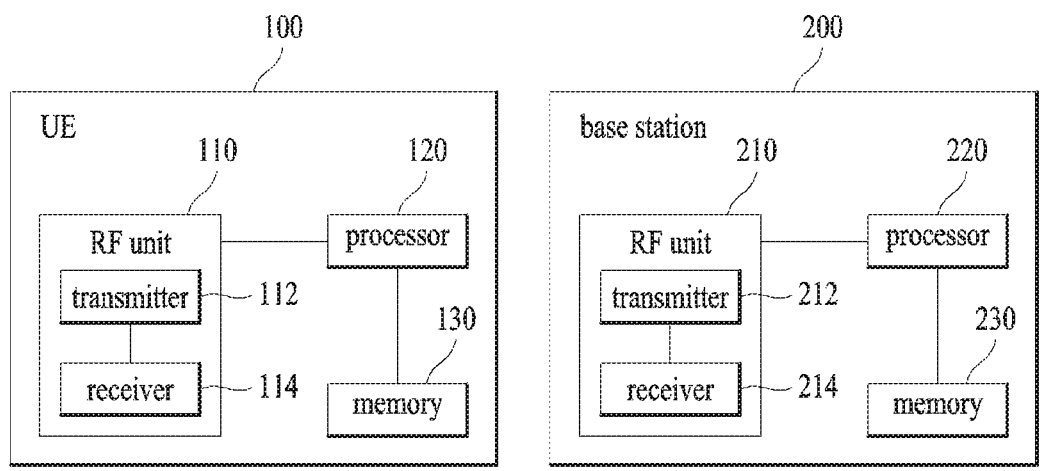
FIG. 6 is a block diagram showing the configuration of a UE and a base station according to one embodiment of the present invention.

FIG. 6 is a block diagram showing the configuration of a UE and a base station according to one embodiment of the present invention.

In FIG. 6, a UE 100 and a BS 200 may include radio frequency (RF) units 110 and 210, processors 120 and 220 and memories 130 and 230, respectively. Although a 1:1 communication environment between the UE 100 and the BS 200 is shown in FIG. 6, a communication environment may be established between a plurality of UEs and the BS 200. In addition, the BS 200 shown in FIG. 6 is applicable to a macro cell base station and a small cell base station.

The RF units 110 and 210 may include transmitters 112 and 212 and receivers 114 and 214, respectively. The transmitter 112 and the receiver 114 of the UE 100 are configured to transmit and receive signals to and from the base station 200 and other UEs and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the UE 100 may perform the methods of the various embodiments of the present invention.

The transmitter 212 and the receiver 214 of the base station 200 are configured to transmit and receive signals to and from another base station and the UEs and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the UE 100 and the base station 200 instruct (for example, control, adjust, or manage) the operations of the UE 100 and the base station 200, respectively. The processors 120 and 220 may be connected to the memories 130 and 180 for storing program code and data, respectively. The memories 130 and 180 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

The present invention can also be embodied as computer-readable code on a computer-readable recording medium. The computer-readable recording medium includes all data storage devices that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer readable code is stored and executed in a distributed fashion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A communication method of a first user equipment (UE) included in a first cell using outdated channel information in a two-cell, two-base station (BS) network environment, each cell including three UEs, the method comprising:
  transmitting nine different first linear combinations for 7 data symbols to a first BS at each time slot for a first time period that includes 9 time slots;
  receiving a first feedback signal for the first linear combinations from a second BS which has received the first linear combinations as interference signals for the first time period;
  transmitting four different second linear combinations for 6 data symbols to the first BS for a first sub-time period of a third time period, which includes 4 time slots;
  receiving a second feedback signal for the second linear combinations from the second BS which has received the second linear combinations as interference signals for the first sub-time period; and
  transmitting reconfiguration signals generated based on the second feedback signal and comprised of eight data symbols to the first BS at each time slot for a third sub-time period of the third time period, which includes 8 time slots,
  wherein the second linear combinations are generated using the first feedback signal, and are signals related to the first UE only among the signals received by the first BS from the three UEs included in the first cell for the first time period, and
  wherein the first feedback signal includes information on a channel coefficient between the first UE and the second BS for the first time period, and the second feedback signal includes information on a channel coefficient between the first UE and the second BS for the first sub-time period.

2. The communication method of claim 1, further comprising repeating the step of transmitting the first linear combinations to the first BS and the step of receiving the first feedback signal a total of three times, wherein the repeating step performs the corresponding steps by changing the 7 data symbols per repetition.

3. The communication method of claim 2, wherein the step of transmitting the second linear combinations to the first BS, the step of receiving the second feedback signal and the step of transmitting the reconfiguration signals to the first BS are repeated a total of two times.

4. The communication method of claim 1, wherein the reconfiguration signals include a null space vector for the second UE or the third UE included in the first cell.

5. The communication method of claim 1, wherein the three UEs included in the first cell do not transmit any data for a second time period that includes 9 time slots.

6. A communication method of a first base station (BS) using outdated channel information in a two-cell, two-BS network environment, each cell including three user equipment (UE)s, the method comprising:
  respectively receiving nine different first linear combinations for 7 data symbols from the three UEs included in a first cell, at each time slot for a first time period that includes 9 time slots;
  receiving linear combinations transmitted from the three UEs included in a second cell to a second BS as first interference signals at each time slot for a second time period that includes 9 time slots;
  respectively transmitting first feedback signals for the first interference signals to the three UEs included in the second cell;
  respectively receiving four different second linear combinations for 6 data symbols from two UEs of the three UEs included in the first cell at each time slot for a first sub-time period of a third time period, which includes 4 time slots;
  receiving linear combinations transmitted from two UEs of the three UEs included in the second cell to the second BS as second interference signals at each time slot for a second sub-time period of the third time period, which includes 4 time slots;
  respectively transmitting second feedback signals for the second interference signals to the two UEs included in the second cell;
  respectively receiving a first reconfiguration signal of a first UE among the two UEs included in the first cell and a second reconfiguration signal of a second UE among the two UEs included in the first cell at each time slot for a third sub-time period of the third time period, which includes 8 time slots, wherein the first and the second reconfiguration signals are comprised of 8 data symbols;
  respectively receiving a third reconfiguration signal of a first UE among the two UEs included in the second cell and a fourth reconfiguration signal of a second UE among the two UEs included in the second cell at each time slot for the third sub-time period of the third time period, wherein the third and the fourth reconfiguration signals are generated based on the second feedback signals and comprised of 8 data symbols; and
  decoding the second linear combinations using the first, the second, the third and the fourth reconfiguration signals and decoding the first linear combinations using the decoded result of the second linear combinations,
  wherein the second linear combinations are signals related to the first and the second UEs among the two UEs only included in the first cell among the signals received by the first BS from the three UEs included in the first cell for the first time period, and
  wherein the first feedback signals include information on channel coefficients between the first BS and the three UEs of the second cell for the first time period, and the second feedback signals include information on channel coefficients between the first BS and the two UEs among the three UEs of the second cell for the second sub-time period.

7. The communication method of claim 6, further comprising the step of repeating the step of receiving the first linear combinations, the step of receiving the first interference signals and the step of transmitting the first feedback signals a total of three times, wherein data symbols of the first interference signals and the first linear combinations are changed per repetition.

8. The communication method of claim 6, further comprising the step of repeating the third time period a total of three times, wherein the two UEs among the three UEs of the first cell transmitting and receiving signals to and from the first BS and the two UEs among the three UEs of the second cell transmitting and receiving signals to and from the first BS for each of three third time periods are changed per repetition.

* * * * *